J. C. INMAN.
AUTOMOBILE TIRE HOLDER PARTICULARLY ADAPTED TO CLENCHER TIRES.
APPLICATION FILED APR. 3, 1916.
1,224,548.
Patented May 1, 1917.
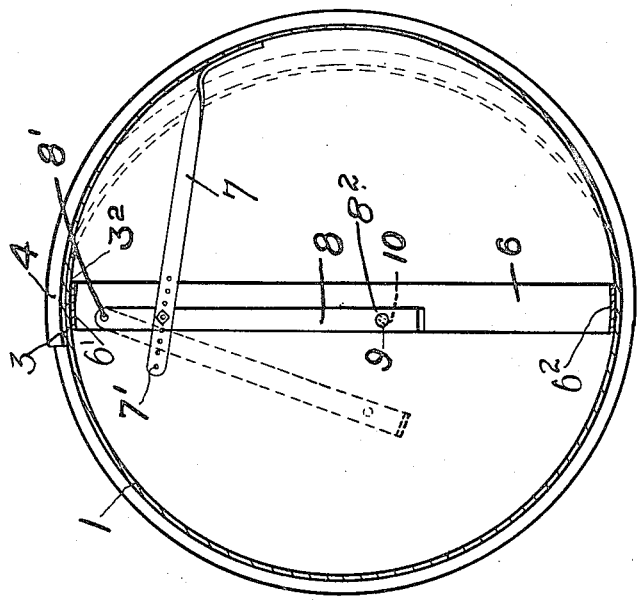
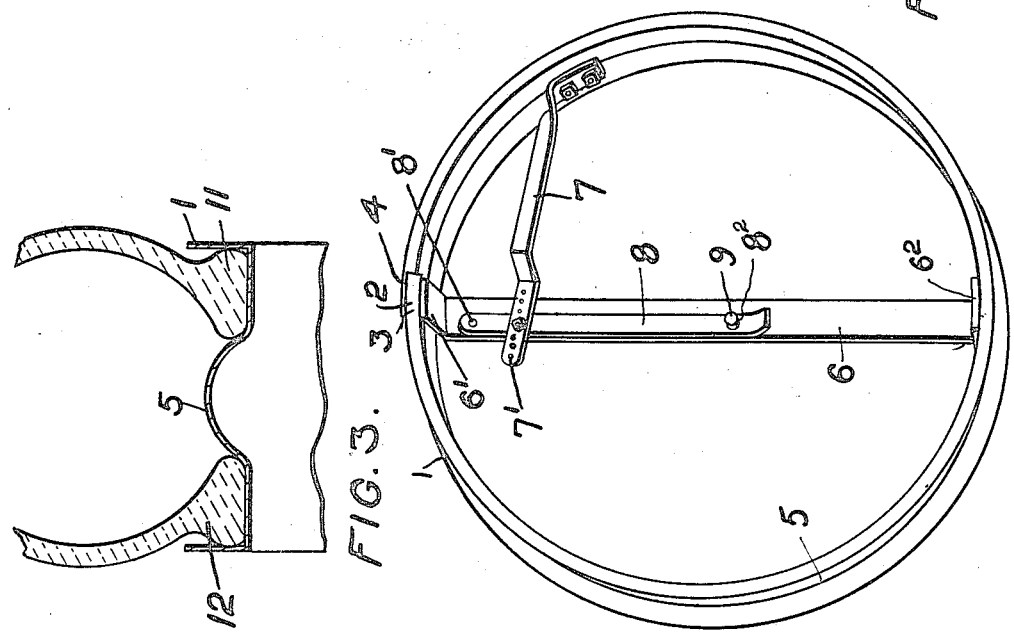
WITNESSES:
INVENTOR:
JOHN. C. INMAN.

UNITED STATES PATENT OFFICE.

JOHN CLARENCE INMAN, OF EDEN, ONTARIO, CANADA.

AUTOMOBILE-TIRE HOLDER PARTICULARLY ADAPTED TO CLENCHER-TIRES.

1,224,548.

Specification of Letters Patent.

Patented May 1, 1917.

Application filed April 3, 1916. Serial No. 88,602.

*To all whom it may concern:*

Be it known that I, JOHN CLARENCE INMAN, of the town of Eden, in the county of Elgin, in the Province of Ontario, Canada, have invented certain new and useful Improvements in Automobile-Tire Holders Particularly Adaptable to Clencher-Tires, of which the following is the specification.

My invention relates to improvements in automobile tire holders particularly adaptable to clencher tires and the object of the invention is to devise a simple form of holder which will keep the tire, when carried thereby, perfectly water tight and prevent the entrance of grit, gravel or other dirt into the tire and it consists essentially of a split band U-shaped in cross section having the split ends overlapping and an annular rib formed in the center and extending around the band from one split end to the other and interlocking means for drawing the overlapping ends of the band to a more or less overlapped position to release the tire and so as to expand the band to grip the tire as hereinafter more particularly explained by the following specification.

Figure 1, is a general perspective view of my holder.

Fig. 2, is a vertical section taken parallel with the face of the holder at one side of the central annular rib.

Fig. 3, is an enlarged sectional perspective detail through the band showing a portion of a clencher tire in the gripped position.

In the drawings like letters of reference indicate corresponding parts in each figure.

1 indicates the band U-shaped in cross section and split at 2 so that the ends 3 and 4 overlap each other. 5 indicates a rib formed in the center of the base of the U-band and extending from end to end of the same. 6 indicates a bridging piece which extends diametrically across the holder and is provided with inturned ends 6′ and 6². The inturned end 6′ is riveted or otherwise suitably secured to the end 3 of the band. The opposite inturned end 6² is secured to the band at a diametrically opposite point. 7 indicates a standard bar secured to the lower portion of the band below the split end 4. The upper end of the standard bar 7 is bent inwardly in close proximity to the bridging bar 6 and extends upwardly across the same. The upper end of the standard bar 7 is provided with a series of orifices 7′ through any one of which a bolt extends and through the lever 8. The lever 8 is pivoted at 8′ to the bridging bar 6 in close proximity to the inturned end 6′. The opposite or free end of the lever 8 is outturned and is provided with an orifice 8² in proximity to such out-turned end. 9 indicates a pin which extends outwardly from the bridging bar and is designed to extend through the orifice 8² when the parts are in the locked position. The pin 9 may be provided with a diametric orifice 10 through which a hasp or padlock may be passed so as to permanently lock the parts together.

When it is desired to place the tire in position upon the holder all that it is necessary to do is to remove the padlock, spring the lever 8 laterally until the orifice 8² is clear of the pin 9, then swing the lever upwardly into the dotted position shown in Fig. 2. By this movement the standard bar 7 is thrown upwardly thereby carrying the end 4 of the band upwardly to overlap the end 3 to a greater extent as indicated by dotted lines in Fig. 2. The tire may then be slipped into position so that the clencher ends 11 and 12 fit into grooves formed at each side of the central annular rib 5.

It will be noted that the sides of the rib are inclined outwardly. By this means when the holder is again expanded the clencher ends 11 and 12 are forced outwardly tight against the flanges of the U-shaped band 1.

In order to expand the holder all that it is necessary to do is to force the lever 8 downwardly and spring it outwardly so that the pin 9 will again pass through the orifice 8². The standard 7 is by this means forced downwardly and the lower portion of the band is carried outwardly to increase the circumference of the holder to a maximum extent and thereby carry the clencher ends 11 and 12 into the grooves all around the band and tight against the flanges of the band as above described.

It will thus be seen that I have provided a holder in which the clencher portions of the tire are supported throughout their entire circumference and are held tight in the supported position against the flanges of the holder thereby preventing any possibility of water, grit or gravel entering into the interior of the tire.

It is well known that when water and grit or gravel are allowed to enter into the interior of a tire that they will gradually destroy the fabric of the tire and when the tire is brought into use any grit or gravel which is allowed to remain within the tire would quickly cause a new puncture.

What I claim as my invention is.

1. In a holder for clencher tires, a split band U-shaped in cross section having overlapping ends, means for expanding the band against the tire and locking it in the expanded position, and means for forcing the clencher portions of the tire outwardly against the flanges of the U-shaped band as the band is carried to the expanded position.

2. In a holder for clencher tires, a split band U-shaped in cross section having overlapping ends, means for expanding the band against the tire and locking it in the expanded position, and a rib located centrally of the band and extending from end to end of the same adapted to force the clencher edges of the tire outwardly.

3. In a holder for clencher tires, a split band U-shaped in cross section having overlapping ends, means for expanding the band against the tire and locking it in the expanded position, and a rib located centrally of the band and extending from end to end thereof and having outwardly inclined sides.

4. In a holder for clencher tires, a split band U-shaped in cross section having overlapping ends, a bridging bar extending across the holder and secured at one end to the underlapping end of the band and at the opposite end to the diametrically opposite portion of the band, a standard bar secured to the lower or free portion of the band having the overlapping end, a lever pivoted upon the bridging bar and pivotally connected to the standard bar, and means for locking the lever in the depressed position.

5. In a holder for a clencher tire, a split band U-shaped in cross section having overlapping ends, a bridging bar extending across the holder and secured at one end to the underlapping end of the band and at the opposite end to the diametrically opposite portion of the band, a standard bar secured to the lower or free portion of the band having the overlapping end, a lever pivoted upon the bridging bar and pivotally connected to the standard and having an orifice in proximity to its free end, a projection carried by the bridging bar over which the lever is designed to be sprung so that the projection passes into the orifice.

6. In a holder for clencher tires, a split band U-shaped in cross section having overlapping ends, a bridging bar extending across the holder and secured at one end to the underlapping end of the band and at the opposite end to the diametrically opposite portion of the band, a standard bar secured to the lower or free portion of the band having the overlapping end, a lever pivoted upon the bridging bar and pivotally connected to the standard, means for locking the lever in the depressed position, and means for adjusting the point of connection between the lever and standard bar.

7. In a holder for clencher tires, a tire supporting member having clencher spreading means and means for limiting the outward spread of the clencher portions.

8. In a holder for clencher tires, a tire supporting member having portions limiting the outward spread of the clencher portions, and a convex portion located intermediately between the limiting portions for spreading the clencher portions into contact with the limiting portions.

9. In a holder for clencher tires, a tire supporting member having portions limiting the outward spread of the clencher portions of the tire, a convex portion located intermediately between the limiting portions, and means for spreading the support radially to force the convex portion in between the clencher portions of the tire.

JOHN CLARENCE INMAN.